(12) United States Patent
Tada et al.

(10) Patent No.: US 7,569,145 B2
(45) Date of Patent: Aug. 4, 2009

(54) VINYLIDENE FLUORIDE BASED RESIN POROUS HOLLOW YARN AND METHOD FOR PRODUCTION THEREOF

(75) Inventors: Yasuhiro Tada, Ibaraki-Ken (JP); Takeo Takahashi, Ibaraki-Ken (JP); Masayuki Hino, Ibaraki-Ken (JP); Toshiya Mizuno, Ibaraki-Ken (JP); Kosuke Abe, Ibaraki-Ken (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 10/574,111

(22) PCT Filed: Sep. 24, 2004

(86) PCT No.: PCT/JP2004/014416

§ 371 (c)(1), (2), (4) Date: Mar. 31, 2006

(87) PCT Pub. No.: WO2005/032700

PCT Pub. Date: Apr. 14, 2005

(65) Prior Publication Data

US 2007/0039872 A1 Feb. 22, 2007

(30) Foreign Application Priority Data

Oct. 3, 2003 (JP) .............................. 2003-346396

(51) Int. Cl.
*B01D 71/26* (2006.01)
*B01D 71/28* (2006.01)
*B29C 65/00* (2006.01)
*B29C 47/00* (2006.01)

(52) U.S. Cl. .............................. 210/500.36; 210/500.42; 210/500.27; 210/500.23; 264/41; 264/178 R; 264/184; 264/209.5; 428/316.1

(58) Field of Classification Search ............ 210/500.23, 210/500.27, 640, 500.36, 500.42; 264/41, 264/45.9, 176.1, 174.14, 177.17, 178 R, 184, 264/209.5; 428/316.1; 96/4, 10
See application file for complete search history.

(56) References Cited

U.S. PATENT DOCUMENTS 4,399,035 A * 8/1983 Nohmi et al. .......... 210/500.23

(Continued)

FOREIGN PATENT DOCUMENTS

EP 1 063 256 12/2000

(Continued)

OTHER PUBLICATIONS

Supplementary European Search Report dated Jul. 4, 2008 issued in connection with European Application No. 04 77 3504 corresponding to the present U.S. application.
English translation of International Preliminary Report on Patentability for PCT/JP2004/014416.

*Primary Examiner*—Ana M Fortuna
(74) *Attorney, Agent, or Firm*—Wenderoth, Lind & Ponack, L.L.P.

(57) ABSTRACT

There is provided a porous hollow fiber of vinylidene fluoride resin which has a water permeation rate that is large per fiber and little dependent on the length, has a large treatment capacity per volume of a filtering module, and is therefore suitable as a microfilter element. That is, a porous hollow fiber, comprising a vinylidene fluoride resin having a weight-average molecular weight of at least $3 \times 10^5$, having a water permeation rate F ($m^3/m^2 \cdot day$) measured at a pressure difference of 100 kPa and at a water temperature of 25° C. in a range of test length L=0.2-0.8 (m) and expressed in a linear relationship with the test length L of: $F = C \cdot L + F_0$ (formula 1) and satisfying requirements (a)-(d) shown below: (a) a average slope C (/day) of: $-20 \leq C \leq 0$, (b) an intercept (basic permeability) $F_0$ ($m^3/m^2 \cdot day$) of: $F_0 \geq 30$, (c) a relation between $F_0$ ($m^3/m^2 \cdot day$) and an average pore diameter P (μm) according to half-dry method of $F_0/P \geq 300$, and (d) an outer diameter of at most 3 mm.

5 Claims, 1 Drawing Sheet

U.S. PATENT DOCUMENTS

| | | | |
|---|---|---|---|
| 4,623,670 A | 11/1986 | Mutoh et al. | |
| 4,666,607 A * | 5/1987 | Josefiak et al. | 210/640 |
| 4,919,856 A * | 4/1990 | Anazawa et al. | 264/413 |
| 5,013,339 A * | 5/1991 | Mahoney et al. | 210/500.23 |
| 5,022,990 A * | 6/1991 | Doi et al. | 210/500.42 |
| 5,626,805 A | 5/1997 | Meguro et al. | |
| 5,696,101 A * | 12/1997 | Wu et al. | 514/57 |
| 6,299,773 B1 * | 10/2001 | Takamura et al. | 210/500.23 |
| 7,140,496 B2 * | 11/2006 | Nagoya et al. | 210/490 |
| 7,258,914 B2 * | 8/2007 | Morikawa et al. | 428/316.6 |
| 2003/0107150 A1 | 6/2003 | Hamanaka et al. | |

FOREIGN PATENT DOCUMENTS

| | | |
|---|---|---|
| JP | 61-233026 | 10/1986 |
| JP | 7-173323 | 7/1995 |
| JP | 9-324067 | 12/1997 |
| JP | 2000-309672 | 11/2000 |
| JP | 2001-87633 | 4/2001 |
| JP | 2001-179062 | 7/2001 |
| JP | 2003-138422 | 5/2003 |
| JP | 2003-210954 | 7/2003 |
| JP | 2003-236351 | 8/2003 |
| WO | 01/28667 | 4/2001 |
| WO | 02/070115 | 9/2002 |

* cited by examiner

VINYLIDENE FLUORIDE BASED RESIN POROUS HOLLOW YARN AND METHOD FOR PRODUCTION THEREOF

TECHNICAL FIELD

The present invention relates to a porous hollow fiber or yarn (also called "hollow fiber-form porous membrane" or "micro-porous tube") used for microfiltration of drugs or bacteria, and more particularly to a porous hollow fiber improved in performances for treatment of water (or liquid) and a process for production thereof.

BACKGROUND ART

Vinylidene fluoride resins are excellent in weatherability and chemical resistance compared with general-purpose resins, such as polyolefins, and also have heat resistance, strength, etc., so that there have been made many proposals regarding porous membranes of vinylidene fluoride resins used as microfiltration membranes for treatment of water (or liquid), particularly hollow fiber-form porous membranes, i.e., porous hollow fibers, and processes for production thereof (e.g., Patent documents 1-4 listed below). In the case where porous hollow fibers are actually used as a filter element for treatment of water (or liquid, hereinafter representatively called "water"), porous hollow fibers (water-collecting tubes) cut in a uniform length of generally ca. 0.2-2 m are bundled to form a module, and in many cases, water to be treated is supplied from the outer surface of the thus-bundled porous hollow fibers and is filtrated through pores formed in the walls into the hollow parts thereof to form treated water, which is caused to flow out of both ends of the porous hollow fibers to obtain filtrated water. A porous hollow fiber used for treatment of water by microfiltration is required of many properties, which are, for example, (i) a uniform pore diameter distribution of a size suitable for removing particles to be removed, (ii) large mechanical durabilities (tensile strength and pressure resistance), (iii) a large treatment capacity (water permeation rate) per single fiber, (iv) a large capacity per volume when formed into a module, and (v) chemical resistance. However, conventional porous hollow fibers of vinylidene fluoride resins have not satisfied all of these requirements for microfiltration.

Patent document 1: JP-A 63-296939
Patent document 2: JP-A 63-296940
Patent document 3: JP-A 3-215535
Patent document 4: JP-A 11-319522

DISCLOSURE OF INVENTION

The present invention aims at providing a porous hollow fiber of vinylidene fluoride resin excellent in properties, such as (i)-(v) described above, and improved overall as a microfiltration member, and a process for production thereof.

The porous hollow fiber of vinylidene fluoride resin according to the present invention has been accomplished to achieve the above-mentioned object and is characterized as a porous hollow fiber, comprising a vinylidene fluoride resin having a weight-average molecular weight of at least $3 \times 10^5$, having a water permeation rate F (m$^3$/m$^2$·day) measured at a pressure difference of 100 kPa and at a water temperature of 25° C. in a range of test length L=0.2-0.8(m) and expressed in a linear relationship with the test length L of:

$$F = C \cdot L + F_0 \quad \text{(formula 1)}$$

and satisfying requirements (a)-(d) shown below:
(a) an average slope C (/day) of: $-20 \leq C \leq 0$,
(b) an intercept (basic permeability) $F_0$ (m$^3$/m$^2$·day) of: $F_0 \geq 30$,
(c) a relation between $F_0$ (m$^3$/m$^2$·day) and an average pore diameter P (μm) according to half-dry method of $F_0/P \geq 300$, and
(d) an outer diameter of at most 3 mm.

Further, the process for producing a porous hollow fiber of vinylidene fluoride resin according to the present invention is characterized by comprising; providing a composition by adding, to 100 wt. parts of a vinylidene fluoride resin having a weight-average molecular weight of at least $3 \times 10^5$, a plasticizer and a good solvent for vinylidene fluoride resin in a total amount of 100-300 wt. parts, preferably 140-220 wt. parts, so that the good solvent occupies 8-22 wt. %, preferably 10-22 wt. %, therein; melt-extruding the composition into a form of hollow fiber; introducing the hollow fiber into an inert liquid while injecting an inert gas into a hollow part thereof to cool and solidify the hollow fiber; and extracting the plasticizer to recover a porous hollow fiber.

BEST MODE FOR PRACTICING THE INVENTION

The porous hollow fiber of vinylidene fluoride resin according to the present invention comprise a vinylidene fluoride resin having a weight-average molecular weight of at least $3 \times 10^5$. The feature of molecular weight being at least $3 \times 10^5$ is principally required to ensure a mechanical strength required of a hollow fiber membrane while satisfying the following requirements (a)-(d) concerning the filtering treatment capacities of the porous hollow fiber.

The porous hollow fiber of the present invention is further characterized by having a water permeation rate F (m$^3$/m$^2$·day) measured at a pressure difference of 100 kPa and at a water temperature of 25° C. in a range of test length L=0.2-0.8(m) and expressed in a linear relationship with the test length L of:

$$F = C \cdot L + F_0 \quad \text{(formula 1)}$$

and satisfying requirements (a)-(d) shown below:
(a) an average slope C (/day) of: $-20 \leq C \leq 0$,
(b) an intercept (basic permeability) $F_0$ (m$^3$/m$^2$ day) of: $F_0 \geq 30$,
(c) a relation between $F_0$ (m$^3$/m$^2$ day) and an average pore diameter P (μm) according to half-dry method of $F_0/P \geq 300$, and
(d) an outer diameter of at most 3 mm.

The meaning of each of the requirements (a)-(d) will be described below. In advance thereof, however, a method used for measuring a water permeation rate F (m$^3$/m$^2$·day) of a porous hollow fiber or hollow fiber porous membrane having a test length of L (m) in the above formula (1).

(Method of Measuring Water Permeation Rates)

Figure 1:
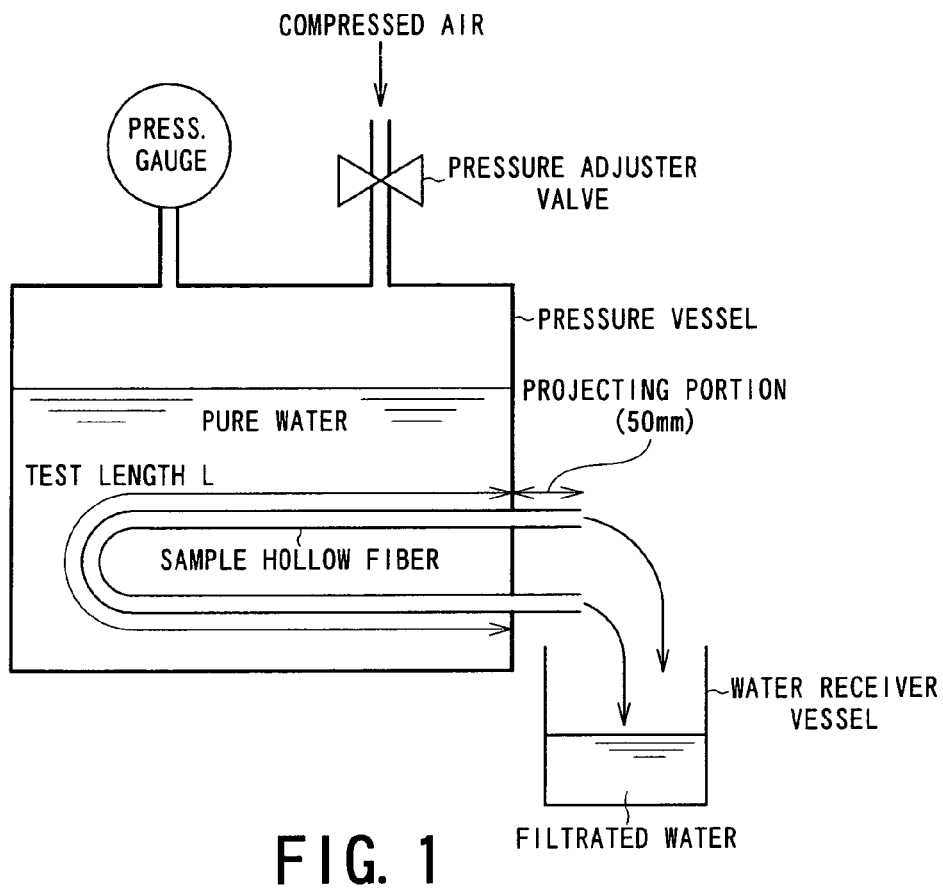
FIG. 1 is a schematic illustration of an apparatus for measuring water permeation rates F corresponding to varying test lengths L for evaluating the performances of the porous hollow fiber of the present invention.

A sample porous hollow fiber was hydrophilized by first immersion in ethanol for 15 minutes and then immersion in pure water for 15 minutes, and then set in an apparatus for measuring water permeation rates shown in FIG. 1 so as to provide a prescribed test length L (i.e., a length effectively used for the filtration) and projecting portions at both ends taken out of a pressure vessel. The projecting portions (portions not used for the filtration and including portions used for joint with the pressure vessel) were set to have a length of 50 mm each at both ends.

After the pressure vessel was filled with an amount of pure water (at 25° C.) sufficient to immerse the porous hollow fiber therein, the pressure vessel was maintained at an inner pressure of 100 kPa to measure a volume of water having flowed out of both ends in a prescribed time and calculate water permeation rate F ($m^3/m^2 \cdot day$) (i.e., a volume of water having flowed through a membrane area of 1 $m^2$ per day). The membrane area was calculated according to the following formula based on the outer diameter;

Membrane area ($m^2$)=outer diameter×π×test length.

Figure 2:
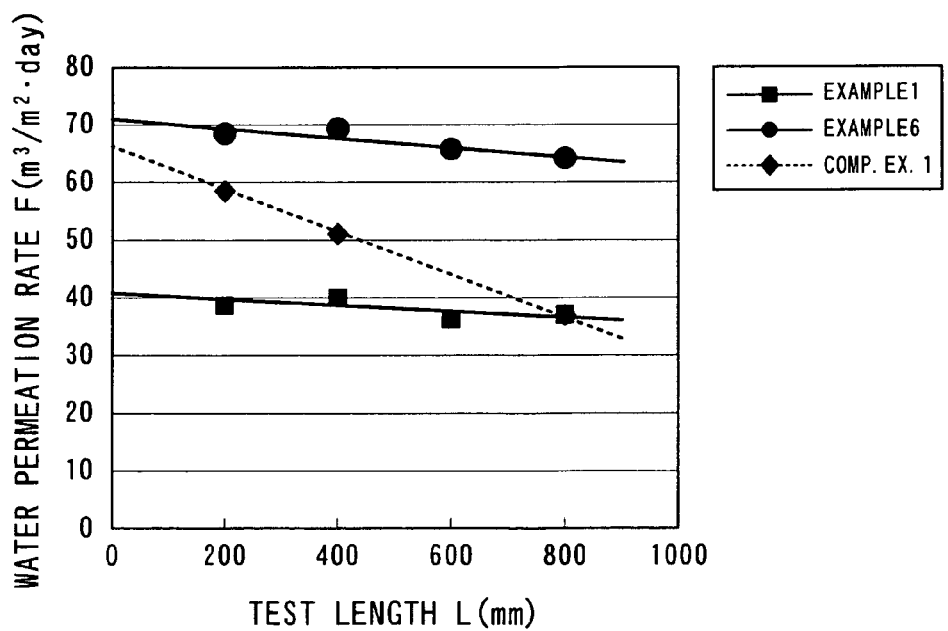
FIG. 2 is a graph showing results measured according to the apparatus of FIG. 1 with respect to porous hollow fibers of Examples and Comparative Example.

Water permeation rates were measured while changing the test length in a range of 200-800 mm and a relationship between the test lengths and water permeation rates was plotted on a graph to obtain a linear relationship formula of test length and water permeation rate: $F=C \cdot L+F_0$ (formula 1). FIG. 2 shows plots of the measured results with respect to porous hollow fibers obtained in some Examples and Comparative Example described hereinafter.

Next, the meanings of the requirements (a)-(d) will be described.

(Meanings of the Requirements (a) and (b))

As mentioned above, a hollow fiber membrane is actually used in a form of being cut in a length of 0.2-2 m and is incorporated within a module. The filtration capacity of a hollow fiber membrane having a limited length is constrained by resistance factors that are a sum of a resistance against water penetrating-through a hollow fiber wall and a resistance against water flowing through a water-collecting tube (a hollow part of the fiber). In case where the water permeation rate of a membrane is increased, the amount of water penetrating into the collecting tube is increased to increase the flow rate through the collecting tube and result in an increased flow resistance, which exerts an unignorable influence to the filtration capacity of the hollow fiber membrane, thus obstructing an increase of treatment capacity proportional to the length (which in turn is proportional to the membrane area). Accordingly, when the water permeation rate ($m^3/m^2 \cdot day$) is evaluated by changing the test length, the formula (1) is caused to have a strong negative slope and the true permeation capacity of the membrane is apparently observed to be decreased as the test length is increased. Thus, a water permeation rate obtained by extrapolating the test length to 0 corresponds to a true water permeation rate of the membrane. As a result, a hollow fiber membrane having a larger slope C (that is, closer to 0) can exhibit a performance closer to the true performance of the membrane when it is used in a form incorporated in a module.

There are plural factors concerning the flow resistance through a water-collecting tube, such as a diameter of the collecting tube (inner diameter of the hollow fiber) and a roughness of the wall, but the inner diameter (influencing by the 4th power thereof is considered to be the most influencing factor if it is assumed that the water flow in the water-collecting tube is a laminar flow according to the Hagen-Poiseuille's law. However, too large an inner diameter results in a lowering in pressure resistance and a lowering in packing density in the module.

Accordingly, in order to increase a filtration capacity of a single hollow fiber membrane, it is necessary to increase the true water permeation capacity (i.e., basic permeability $F_0$) and decrease the dependence thereof on the length (i.e., a larger slope C while taking the sign thereof into consideration). Two major characteristics of the present invention are to have provided a porous hollow fiber satisfying (b) a large $F_0$ of at least 30 ($m^3/m^2 \cdot day$) and (a) a large coefficient C of $-20 \leq C \leq 0$ (i.e., a small absolute value in a negative range).

Explaining further about the requirement (a) in order to provide a negative coefficient C having a small absolute value ($-20 \leq C$), it is essential to provide a small resistance per unit flow rate through the hollow fiber (in other words, a larger permeability $F_0$ relative to the flow resistance). As mentioned above, the flow resistance is inversely proportional to the 4th power of the inner diameter. Noting this point, the present inventors have found a good correlation between an absolute value of C and a value of $F_0/D_i^4$. More specifically, in order to satisfy the condition (a) of $-20 \leq C \leq 0$, it has been found necessary to satisfy a condition expressed by an empirical formula of $F_0/D_i^4 \leq 75$ (See experimental data shown in Table 1 appearing hereinafter). This is a preferable supplementary condition for defining the porous hollow fiber of the present invention.

(Requirement (c))

The water permeation rate through a membrane (i.e., a hollow fiber wall) increases as the pore diameter increases at an equal number of (penetrable) pores. On the other hand, the pore diameter is restricted depending on an object to be separated, and unless the pore diameter is smaller than the size of the object to be separated, the membrane cannot be used for the filtration. A large basic permeability ($F_0$) relative to a pore diameter (P) means a high level of compatibility of the separation performance and the water permeability of a membrane. Further, this also means that a sufficient pressure resistance is ensured despite a high porosity giving a sufficient number of penetrable pores and a sufficiently large inner diameter.

Thus, a third characteristic feature of the porous hollow fiber of the present invention is $F_0/P$ of at least 300, preferably 500 or larger.

(Requirement (d))

With respect to a module that is an actual form of use of a hollow fiber membrane, a smaller outer diameter of hollow fiber leads to a larger density of hollow fiber packable in a module (i.e., a larger number of hollow fibers per unit sectional area of the module), thus leading to a larger filtration capacity of the module. In order to be compatible with the above-mentioned concept of a larger inner diameter, this requires a smaller membrane thickness, thus requiring solutions to the problems of complexity in forming, mechanical strength and reliability of separation performance of the membrane by preventing pinholes.

The porous hollow fiber of the present invention has been provided by achieving the above requirements (a)-(c) while retaining (d) a small outer diameter of at most 3 mm, thereby allowing an increase in filtration capacity per volume of a module.

Hereinbelow, the porous hollow fiber of vinylidene fluoride resin according to the present invention is described with reference to a preferred process for production thereof, i.e., the production process according to the present invention.

(Vinylidene Fluoride Resin)

A principal membrane-forming material used in the present invention is a vinylidene fluoride resin having a weight-average molecular weight (Mw) of at least $3 \times 10^5$ (which corresponds to an inherent viscosity $\eta_{inh}$ (referring to a logarithmic viscosity at 30° C. of a solution of 4 g of the resin in 1 liter of N,N-dimethylformamide) of at least 1.2 dl/g). This is required to provide necessary mechanical strengths (particularly, tensile strength and elongation at breakage) while satisfying the above-mentioned requirements (a)-(d) principally relating to the filtration performances of the porous hollow fiber, and an Mw of $4 \times 10^5$ or higher (corresponding to $\eta_{inh} \geq 1.5$) is further preferred.

The vinylidene fluoride resin used in the present invention may be homopolymer of vinylidene fluoride, i.e., polyvinylidene fluoride, or a copolymer of vinylidene fluoride together with a monomer copolymerizable with vinylidene fluoride, or a mixture of these. Examples of the monomer copolymerizable with vinylidene fluoride may include: tetrafluoroethylene, hexafluoropropylene, trifluoroethylene, chlorotrifluoroethylene and vinyl fluoride, which may be used singly or in two or more species. The vinylidene fluoride resin may preferably comprise at least 70 mol % as the constituent unit. Among these, it is preferred to use homopolymer consisting of 100 mol % of vinylidene fluoride in view of its high mechanical strength. A vinylidene fluoride resin of a relatively high vinylidene fluoride content as described above may preferably be obtained by emulsion polymerization or suspension polymerization, particularly preferably by suspension polymerization.

In order to produce a porous hollow fiber of the necessary properties through the process of the present invention, it is preferred that the vinylidene fluoride resin has a certain degree of broad molecular weight distribution. This is represented by a ratio Mw/Mn (between weight-average molecular weight (Mw) and number-average molecular weight (Mn)) of at least 2.0, preferably at least 2.2, further preferably at least 2.4, particularly preferably at least 2.5. However, in the case where the weight-average molecular weight is $4 \times 10^5$ or higher, the requirement of Mw/Mn tends to be alleviated, and good results can be attained even at an Mw/Mn ratio of at least 2.0 while a preferred value is at least 2.1. Such a vinylidene fluoride resin having a broad molecular weight distribution may be conveniently obtained by preparing at least two species of vinylidene fluoride resins having different average molecular weights respectively through polymerization, and blending these resins. More specifically, according to a preferred embodiment of the present invention, a principal membrane-forming starting material is given by a mixture of 2-49 wt. % of a first vinylidene fluoride resin having a weight-average molecular weight (Mw1) of $4 \times 10^5$-$12 \times 10^5$, preferably $6 \times 10^5$-$12 \times 10^5$, and a second vinylidene fluoride resin having a weight-average molecular weight (Mw2) of $1.5 \times 10^5$-$6 \times 10^5$, preferably $2 \times 10^5$-$5 \times 10^5$ provided that a ratio Mw1/Mw2 between the weight-average molecular weights of the first and second vinylidene fluoride resins) is at least 1.2, preferably at least 1.5, particularly preferably 2.0 or higher.

The vinylidene fluoride resin used in the present invention may preferably be a non-crosslinked one for easiness of melt-extrusion of the composition described below, and may preferably have a melting point of 160-220° C., more preferably 170-180° C., further preferably 175-179° C. Below 160° C., the resultant porous membrane is liable to have an insufficient heat distortion resistance, and above 220° C., the melt-mixability of the resin is lowered so that the formation of a uniform film or membrane becomes difficult.

The melting point means a heat absorption peak temperature accompanying crystal melting of the resin as measured by means of a differential scanning calorimeter (DSC).

According to the present invention, a plasticizer and a good solvent for vinylidene fluoride resin are added to the above-mentioned vinylidene fluoride resin to form a starting composition for formation of the membrane.

(Plasticizer)

As the plasticizer, aliphatic polyesters of a dibasic acid and a glycol may generally be used. Examples thereof may include: adipic acid-based polyesters of e.g., the adipic acid-propylene glycol type, and the adipic acid-1,3-butylene glycol type; sebacic acid-based polyesters of, e.g., the sebacic acid-propylene glycol type; and azelaic acid-based polyesters of e.g., the azelaic acid-propylene glycol type, and azelaic acid-1,3-butylene glycol type.

(Good Solvent)

As the good solvent for vinylidene fluoride resin, those capable of dissolving vinylidene fluoride resin in a temperature range of 20-250° C. may be used. Examples thereof may include: N-methylpyrrolidone, dimethylformamide, dimethylacetamide, dimethyl sulfoxide, methyl ethyl ketone, acetone, tetrahydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

(Composition)

The starting composition for formation of the membrane may preferably be obtained by mixing 100 wt. parts of the vinylidene fluoride resin with the plasticizer and the good solvent for vinylidene fluoride resin in a total amount of 140-220 wt. parts in which the good solvent occupies 10-22 wt. %.

If the total amount of the plasticizer and the good solvent is too small, the viscosity of the composition at the time of melt-extrusion becomes excessively high, and if too large, the viscosity of the composition at the time of melt-extrusion becomes excessively lowered. In either case, it becomes difficult to obtain a porous hollow fiber having a uniform and appropriately high porosity, and accordingly an appropriately high filtration performance (water permeation rate). Further, if the proportion of the good solvent in both components is too small, the uniform mixing of the vinylidene fluoride resin and the plasticizer is obstructed or requires a long time. On the other hand, if the proportion of the good solvent is too large, an effective pore formation owing to the extraction of the plasticizer is rather obstructed to fail in providing a high porosity corresponding to the amount of the plasticizer.

(Mixing and Melt-extrusion)

The melt-extrusion composition may be extruded into a hollow fiber film by extrusion through an annular nozzle at a temperature of 140-270° C., preferably 150-200° C. Accordingly, the manners of mixing and melting of the vinylidene fluoride resin, plasticizer and good solvent are arbitrary as far as a uniform mixture in the above-mentioned temperature range can be obtained consequently. According to a preferred embodiment for obtaining such a composition, a twin-screw kneading extruder is used, and the vinylidene fluoride resin (preferably in a mixture of the first and second vinylidene fluoride resins) is supplied from an upstream side of the extruder and a mixture of the plasticizer and the good solvent is supplied at a downstream position to be formed into a uniform mixture until they pass through the extruder and are discharged. The twin-screw extruder may be provided with a plurality of blocks capable of independent temperature control along its longitudinal axis so as to allow appropriate temperature control at respective positions depending on the contents of the materials passing therethrough.

(Cooling)

In the process of the present invention, the melt-extruded hollow fiber film is cooled from an outside thereof and solidified by introducing the extruded film into a bath of inert liquid while injecting an inert gas into a hollow part of the hollow fiber film.

The introduction of an inert gas into the hollow part of the hollow fiber film is performed principally for adjusting the inner diameter of the hollow fiber, and the introduction into the inert liquid bath is performed for removing heat of the hollow fiber film preferentially from an outside thereof. As a result of the heat removal preferentially from the outside, it is possible to form a moderate crystallite size distribution in the thickness-wise direction, which favors a smooth stretching thereafter. The inert gas can be any gas that does not react with the melt-extruded hollow fiber film, and air, nitrogen, etc., may be suitably be used therefor. Such an inert gas may ordinarily be supplied through a gas supply port provided at a center of the annular nozzle for the extrusion at a constant flow rate or at a constant pressure so as to provide a desired inner diameter of hollow fiber. As the inert liquid, any liquid that is inert and does not show a substantial dissolving power to the melt-extruded hollow fiber film can be used, but water is preferably used. The temperature of the inert liquid can be selected from a broad temperature range of 5-120° C., but may preferably be in a range of 10-100° C., particularly preferably 30-80° C.

(Extraction)

The cooled and solidified hollow fiber film is then introduced into an extraction liquid bath to remove the plasticizer and the good solvent therefrom, thereby forming a hollow fiber membrane. The extraction liquid is not particularly restricted provided that it does not dissolve the vinylidene fluoride resin while dissolving the plasticizer and the good solvent. Suitable examples thereof may include: polar solvents having a boiling point on the order of 30-100° C., inclusive of alcohols, such as methanol and isopropyl alcohol, and chlorinated hydrocarbons, such as dichloromethane and 1,1,1-trichloroethane.

[Preferable Additional Treatment Steps]

A porous hollow fiber of vinylidene fluoride resin according to the present invention can be obtained through the above-mentioned steps, but steps as described below may preferably be adopted as desired.

(Stretching)

It is also preferred to stretch the hollow fiber film or membrane before or after the extraction to increase the porosity of the product porous hollow fiber, thereby increasing the water permeation rate thereof. The stretching may preferably be performed by uniaxially stretching the hollow fiber film or membrane in the longitudinal direction thereof, e.g., by using a pair of rollers rotating at different peripheral speeds. This is because it has been found that a microscopic texture including a stretched fibril portion and a non-stretched node portion appearing alternately in the stretched direction is preferred for the porous hollow fiber membrane of the present invention to exhibit a harmony of porosity and strength-elongation thereof. The stretching ratio may appropriately be 1.2-4.0 times, particularly ca. 1.4-3.0 times.

(Heat Treatment)

In the case of performing the stretching after the extraction of the plasticizer, it is preferred to heat-treat the hollow fiber membrane at a temperature in a range of 80-160° C., preferably 100-140° C., for 1-3600 sec., preferably 3-900 sec., thereby increasing its crystallinity for the purpose of providing an improved processability for subsequent stretching.

(Elution Liquid Treatment)

It is particularly preferred to subject the porous hollow fiber membrane after the stretching to a treatment of immersion in an elution liquid. This is because owing to the elution liquid treatment, the porous hollow fiber membrane of the present invention can be provided with a remarkably increased water permeability without essentially impairing the characteristic properties thereof. As the elution liquid, an alkaline liquid, an acidic liquid or an extraction liquid for the plasticizer is used.

The reason why the water permeability of the porous membrane is remarkably increased by the elution liquid treatment has not been fully clarified as yet, but it is presumed that the plasticizer is exposed at the minute pore wall enlarged in diameter by the stretching and is effectively removed by the elution liquid treatment. The alkaline or acidic liquid as the elution liquid is considered to decompose and solubilize the polyester used as the plasticizer for the vinylidene fluoride resin, thereby promoting the elution and removal thereof.

Accordingly, as the alkaline liquid, it is preferred to use an aqueous solution or a solution in water/alcohol of a strong base, such as sodium hydroxide, potassium hydroxide or calcium hydroxide, at a pH of at least 12, preferably 13 or higher. On the other hand, as the acidic liquid, it is preferred to use an aqueous solution or a solution in water/alcohol of a strong acid, such as hydrochloric acid, sulfuric acid or phosphoric acid at a pH of at most 4, preferably 3 or lower, particularly preferably 2 or lower.

Further, as the extraction liquid for the plasticizer, those dissolving the plasticizer without dissolving the vinylidene fluoride resin can be used without particular restriction similarly as the one used before the stretching. For example, polar solvents having a boiling point of ca. 30-100° C. are suitably used, inclusive of alcohols, such as methanol and isopropyl alcohol, and chlorinated hydrocarbons, such as dichloromethane, and 1,1,1-trichloromethane.

The elution liquid treatment may be effected by immersing the hollow fiber membrane in the elution liquid at a temperature of ca. 5-100° C. for 10 sec. to 6 hours, after an optional pre-immersion for improving the affinity to the liquid. In case where the elution liquid treatment is performed at an elevated temperature, it is preferred to fix the hollow fiber membrane so as not to cause the shrinkage thereof during the treatment.

After removing the elution liquid, the hollow fiber membrane after the elution treatment may preferably be further subjected to a heat-setting treatment in order to improve the size stability of the resultant product hollow fiber. The heat-setting treatment may be performed at 80-160° C. for 1 min. to 60 hours, preferably ca. 3 min. to is 15 hours, in the case of a batchwise treatment, but even a treatment at a similar temperature for at least 1 sec., preferably 3 sec. or longer may also be effective in the case of a successive treatment subsequent to the elution liquid treatment.

(Porous Hollow Fiber of Vinylidene Fluoride Resin)

The porous hollow fiber of vinylidene fluoride resin of the present invention obtained as described above may be generally provided with properties, inclusive of a porosity of 55-90%, preferably 60-85%, particularly preferably 65-80%; a tensile strength of at least 5 MPa, and an elongation at break of at least 5%. The hollow fiber may preferably have an outer diameter of 0.3-3 mm, particularly ca. 1-3 mm, an inner diameter of 0.8-2.98 mm, particularly 0.9-2.98 mm, and a membrane thickness in a range of 0.01-0.4 mm. Further, the average pore diameter P according to the half-dry method may preferably be 0.01-0.25 µm, more preferably 0.03-0.20 µm, particularly preferably 0.05-0.15 µm. The porous hollow fiber according to the present invention is especially characterized by a small membrane thickness, a large water permeation rate regardless of a small average pore diameter P, and a small dependence on the length of the water permeation rate. By taking advantage of the small length-dependence of water permeation rate, the length of a single hollow fiber membrane of the present invention constituting a module may preferably be set in a range of 0.5-3 m, particularly 0.8-2.5 m, which is some what longer compared with the conventional range of 0.2-2 m.

EXAMPLES

Hereinbelow, the present invention will be described more specifically based on Examples and Comparative Examples. The properties other than the above-mentioned water permeation rates F and $F_0$ described herein including those described below are based on measured values according to the following methods.

(Weight-average Molecular Weight (Mw) and Number-average Molecular Weight (Mn))

A GPC apparatus ("GPC-900", made by Nippon Bunko K.K.) was used together with a column of "Shodex KD-806M and a pre-column of "Shodex KD-G" (respectively made by Showa Denko K.K.), and measurement according to GPC (gel permeation chromatography) was performed by using NMP as the solvent at a flow rate of 10 ml/min. at a temperature of 40° C. to measure polystyrene-based molecular weights.

(Porosity)

The length and also the outer diameter and inner diameter of a sample porous hollow fiber membrane were measured to calculate an apparent volume V ($cm^3$) of the porous hollow fiber, and the weight W (g) of the porous hollow fiber was measured to calculate a porosity according to the following formula:

porosity (%)=$(1-W/(V \times \rho)) \times 100$, wherein ρ: density of PVDF (=1.78 $g/cm^3$).

(Average Pore Diameter)

An average pore diameter was measured according to the half-dry method based on ASTM F316-86 and ASTM E1294-89 by using "PERMPOROMETER CFP-2000AEX" made by Porous Materials, Inc. A perfluoropolyester (trade name "Galwick") was used as the test liquid.

(Maximum Pore Diameter)

A maximum pore diameter was measured according to the bubble-point method based on ASTM F316-86 and ASTM E1294-89 by using "PERMPOROMETER CFP-2000AEX" made by Porous Materials, Inc. A perfluoropolyester (trade name "Galwick") was used as the test liquid.

(Tensile Strength and Elongation at Break)

Measured by using a tensile tester ("RTM-100", made by Toyo Baldwin K.K.) under the conditions of an initial sample length of 100 mm and a crosshead speed of 200 mm/min. in an environment of a temperature of 23° C. and a relative humidity of 50%.

Example 1

A first polyvinylidene fluoride (PVDF) (powder) having a weight-average molecular weight (Mw) of $6.91 \times 10^5$ and a second polyvinylidene fluoride (PVDF) (powder) having Mw=$2.59 \times 10^5$ were blended in proportions of 25 wt. % and 75 wt. %, respectively, by a Henschel mixer to obtain a mixture A having Mw=$3.67 \times 10^5$ and an Mw/Mn (number-average molecular weight) ratio of 2.95.

An adipic acid-based polyester plasticizer ("PN-150", made by Asahi Denka Kogyo K.K.) as an aliphatic polyester and N-methylpyrrolidone (NMP) as a solvent were mixed under stirring in a ratio of 87.5 wt. %/12.5 wt. % at room temperature to obtain a mixture B.

An equi-directional rotation and engagement-type twin-screw extruder ("BT-30", made by Plastic Kogaku Kenkyusyo K.K.; screw diameter: 30 mm, L/D=48) was used, and the mixture A was supplied from a powder supply port at a position of 80 mm from the upstream end of the cylinder and the mixture B heated to 100° C. was supplied from a liquid supply port at a position of 480 mm from the upstream end of the cylinder at a ratio of mixture A/mixture B=40/60 (wt. %), followed by kneading at a barrel temperature of 220° C. to extrude the melt-kneaded product through a nozzle having an annular slit of 7 mm in outer diameter and 5 mm in inner diameter into a hollow fiber form extrudate at a rate of 9.8 g/min. In this instance, air was injected into a hollow part of the fiber at a rate of 6.2 ml/min. through an air supply port provided at a center of the nozzle.

The extruded mixture in a molten state was introduced into a water bath having a surface 30 mm distant from the nozzle (i.e., an air gap of 30 mm) to be cooled and solidified (at a residence time in water bath of ca. 10 sec.), pulled up at a take-up speed of 5 m/min. and wound up to obtain a first intermediate form. The first intermediate form was found to have an inner diameter of 1.462 mm and an outer diameter of 2.051 mm.

Then, the first intermediate form was fixed so as not to shrink in the longitudinal direction and, while being kept in the fixed state, was immersed under vibration in dichloromethane at room temperature for 30 min, followed by immersion in fresh dichloromethane again under the same conditions to extract the aliphatic polyester and solvent and further by 1 hour of heating in an oven at 120° C., while being continually fixed, for removal of the dichloromethane and heat treatment, thereby to obtain a second intermediate form.

Then, the second intermediate form was longitudinally stretched at a ratio of 1.8 times at an environmental temperature of 25° C. and then, while being fixed so as not to shrink in the longitudinal direction, was immersed under vibration in dichloromethane at room temperature for 30min., followed further by immersion in fresh dichloromethane under the same conditions, then heat-treated for 1 hour in an oven at 150° C. while being continually fixed, thereby effecting the removal of the dichloromethane and heat fixation, to obtain a porous hollow fiber of vinylidene fluoride resin.

The thus-obtained porous hollow fiber of vinylidene fluoride resin had micropores exhibiting an average pore diameter of 0.129 µm and a maximum pore diameter 0.275 µm representing good separation performance through the membrane, and also exhibited an $F_0$ value of 40.4 ($m^3/m^2 \cdot day$) representing a large water permeation performance and also a small absolute value of C representing a sufficient water permeation performance even when incorporated in an actual module.

The production conditions and the physical properties of the resultant polyvinylidene fluoride-based porous hollow fiber are inclusively shown in Table 1 appearing hereinafter together with those of Examples and Comparative Examples described below.

Further, the data of water permeation rate F measured by changing the test length L are plotted in FIG. 2 together with the data obtained with some other Example and comparative example.

Example 2

A porous hollow fiber was prepared in the same manner as in Example 1 except for using a mixture A obtained by replacing the second polyvinylidene fluoride (PVDF) with a PVDF (powder) having Mw=3.39×10$^5$, and changing the supply ratio of the mixture A and the mixture B to 35.3/64.7 (wt. %), the air gap to 70 mm and the stretching ratio to 1.6 times.

Example 3

A porous hollow fiber was prepared in the same manner as in Example 1 except for using a mixture A obtained by replacing the second polyvinylidene fluoride (PVDF) with a PVDF (powder) having Mw=4.12×10$^5$ and also using a mixture B obtained by changing the mixing ratio of the plasticizer and the solvent to 82.5/17.5 (wt. %), and changing the supply ratio of the mixture A and the mixture B to 34.3/65.7 (wt. %), the air gap to 350 mm and the stretching ratio to 1.4 times.

Example 4

A porous hollow fiber was prepared in the same manner as in Example 1 except for using a mixture A obtained by replacing the first polyvinylidene fluoride (PVDF) with a PVDF (powder) having Mw=9.36×10$^5$ and the second polyvinylidene fluoride (PVDF) with a PVDF (powder) having Mw=3.39×10$^5$ and changing the mixing ratio of the first PVDF and the second PVDF to 15/85 (wt. %) and also using a mixture B obtained by changing the mixing ratio of the plasticizer and the solvent to 85/15 (wt. %), and changing the supply ratio of the mixture A and the mixture B to 35.3/64.7 (wt. %), the air gap to 150 mm and the stretching ratio to 1.8 times.

Example 5

A porous hollow fiber was prepared in the same manner as in Example 4 except for using a mixture A obtained by replacing the second polyvinylidene fluoride (PVDF) with a PVDF (powder) having Mw=4.12×10$^5$, and changing the mixing ratio of the first PVDF and the second PVDF to 5/95 (wt. %) and also using a mixture B obtained by changing the mixing ratio of the plasticizer and the solvent to 82.5/17.5 (wt. %) and changing the supply ratio of the mixture A and the mixture B to 35.7/64.3 (wt. %), the air gap to 150 mm and the stretching ratio to 1.5 times.

Example 6

A porous hollow fiber was prepared in the same manner as in Example 5 except for changing the stretching ratio to 1.7 times.

Example 7

A porous hollow fiber was prepared in the same manner as in Example 6 except for changing the nozzle outer diameter to 5 mm, the nozzle inner diameter to 3.5 mm and the air gap to 170 mm.

Comparative Example 1

A porous hollow fiber was prepared in the same manner as in Example 1 except for using a mixture A obtained by changing the mixing ratio of the first PVDF and the second PVDF to 12.5/87.5 (wt. %), changing the supply ratio of the mixture A and the mixture B to 37.5/62.5 (wt. %), changing the air gap to 10 mm, omitting the positive air injection through the air port at the center of the nozzle to allow the sizing of the fiber hollow due to natural drawn of the melt-extrudate, and changing the stretching ratio to 1.6 times.

The resultant polyvinylidene fluoride-based porous hollow fiber had micropores exhibiting an average pore diameter of 0.089 μm and a maximum pore diameter of 0.181 μm representing good separation performance of the membrane and also exhibited an $F_0$-value of 66.3 (m$^3$/m$^2$·day) representing a large water permeation performance through the membrane. However, the porous hollow fiber exhibited a small C-value representing a remarkable lowering in water permeation performance when incorporated in an actual module.

The production conditions and physical properties of the thus obtained polyvinylidene fluoride-based porous hollow fiber are also shown in Table 1.

Comparative Example 2

The production of a porous hollow fiber was tried up to the extrusion in the same manner as in Comparative Example 1 except for injecting air at a flow rate of 6.2 ml/min. through an air supply port at the nozzle center, whereby the extruded follow fiber film was collapsed in the water both, thus failing to provide a hollow fiber.

Comparative Example 3

The production of a porous hollow fiber was tried up to the extrusion in the same manner as in Example 1 except for changing the supply ratio of the mixture A and the mixture B to 35.3/64.7 (wt. %), whereby the extruded follow fiber film was collapsed in the water both, thus filing to provide a hollow fiber.

TABLE 1

|  |  |  | EXAMPLE | | | | |
|  |  |  | 1 | 2 | 3 | 4 | 5 |
| --- | --- | --- | --- | --- | --- | --- | --- |
| Starting material composition | Mixture A | 1st. PVDF's Mw (Mw1) (×10$^5$) | 6.91 | 6.91 | 6.91 | 9.36 | 9.36 |
|  |  | 2nd. PVDF's Mw (Mw2) (×10$^5$) | 2.59 | 3.39 | 4.12 | 3.39 | 4.12 |
|  |  | Mw1/Mw2 | 2.67 | 2.04 | 1.68 | 2.76 | 2.27 |

TABLE 1-continued

|  |  |  | | | | | |
|---|---|---|---|---|---|---|---|
|  |  | 1st. PVDF/2nd. PVDF mixing ratio (wt. %) | 25/75 | 25/75 | 25/75 | 15/85 | 5/95 |
|  |  | Mixture's Mw ($\times 10^5$) | 3.67 | 4.27 | 4.82 | 4.29 | 4.38 |
|  |  | Mw/Mn | 2.95 | 2.29 | 2.23 | 2.15 |  |
|  | Mixture B | Polyester plasticizer | PN-150 | PN-150 | PN-150 | PN-150 | PN-150 |
|  |  | Solvent | NMP | NMP | NMP | NMP | NMP |
|  |  | Plasticizer/solvent mixing ratio (wt. %) | 87.5/12.5 | 87.5/12.5 | 82.5/17.5 | 85/15 | 82.5/17.5 |
|  | Mixture A/Mixture B Supply ratio (wt. %) |  | 40/60 | 35.3/64.7 | 34.3/65.7 | 35.3/64.7 | 35.7/64.3 |
| Spinning and stretching conditions | Nozzle O.D. (mm) |  | 7 | 7 | 7 | 7 | 7 |
|  | Nozzle I.D. (mm) |  | 5 | 5 | 5 | 5 | 5 |
|  | Air supply rate (ml/min) |  | 6.2 | 6.2 | 6.2 | 6.2 | 6.2 |
|  | Air gap (mm) |  | 30 | 70 | 350 | 150 | 150 |
|  | Water bath temp. (° C.) |  | 60 | 60 | 60 | 60 | 60 |
|  | Take-up speed (m/min) |  | 5 | 5 | 5 | 5 | 5 |
|  | Do before extraction (mm) |  | 2.051 | 1.812 | 1.879 | 1.739 | 1.943 |
|  | Di before extraction (mm) |  | 1.462 | 1.223 | 1.265 | 1.200 | 1.363 |
|  | Stretch ratio (times) |  | 1.8 | 1.6 | 1.4 | 1.8 | 1.5 |
| Physical properties | Outer diameter Do (mm) |  | 1.626 | 1.495 | 1.532 | 1.455 | 1.567 |
|  | Inner diameter Di (mm) |  | 1.133 | 0.958 | 0.989 | 0.941 | 1.061 |
|  | Thickness (mm) |  | 0.247 | 0.269 | 0.272 | 0.257 | 0.253 |
|  | Porosity (%) |  | 74.5 | 74.3 | 73.8 | 75.7 | 72.5 |
|  | Ave. pore size P (μm) |  | 0.129 | 0.104 | 0.095 | 0.120 | 0.103 |
|  | Max. pore size (μm) |  | 0.275 | 0.220 | 0.190 | 0.260 | 0.229 |
|  | Water permeability C value (/day, 100 kPa at 25° C.) |  | −4.9 | −9.8 | −11.7 | −19.0 | −10.0 |
|  | Fo value (m$^3$/m$^2$ · day, 100 kPa at 25° C.) |  | 40.4 | 48.9 | 59.3 | 58.2 | 59.3 |
|  | Fo/P |  | 313.2 | 470.2 | 624.2 | 485.0 | 575.7 |
|  | Fo/Di$^4$ |  | 26.3 | 58.1 | 62.0 | 74.2 | 46.8 |
|  | Tensile strength (MPa) |  |  |  |  |  |  |
|  | Elongation at break (%) |  |  |  |  |  |  |

|  |  |  | EXAMPLE | | | | |
|---|---|---|---|---|---|---|---|
|  |  |  | 6 | 7 | Comp. 1 | Comp. 2 | Comp. 3 |
| Starting material composition | Mixture A | 1st. PVDF's Mw (Mw1) ($\times 10^5$) | 9.36 | 9.36 | 6.91 | 6.91 | 6.91 |
|  |  | 2nd. PVDF's Mw (Mw2) ($\times 10^5$) | 4.12 | 4.12 | 2.59 | 2.59 | 2.59 |
|  |  | Mw1/Mw2 | 2.27 | 2.27 | 2.67 | 2.67 | 2.67 |
|  |  | 1st. PVDF/2nd. PVDF mixing ratio (wt. %) | 5/95 | 5/95 | 12.5/87.5 | 12.5/87.5 | 25/75 |
|  |  | Mixture's Mw ($\times 10^5$) | 4.38 | 4.38 | 3.13 | 3.13 | 3.67 |
|  |  | Mw/Mn |  |  | 2.58 | 2.58 | 2.95 |
|  | Mixture B | Polyester plasticizer | PN-150 | PN-150 | PN-150 | PN-150 | PN-150 |
|  |  | Solvent | NMP | NMP | NMP | NMP | NMP |
|  |  | Plasticizer/solvent mixing ratio (wt. %) | 82.5/17.5 | 82.5/17.5 | 87.5/12.5 | 87.5/12.5 | 87.5/12.5 |
|  | Mixture A/Mixture B Supply ratio (wt. %) |  | 35.7/64.3 | 35.7/64.3 | 37.5/62.5 | 37.5/62.5 | 35.3/64.7 |
| Spinning and stretching conditions | Nozzle O.D. (mm) |  | 7 | 5 | 7 | 7 | 7 |
|  | Nozzle I.D. (mm) |  | 5 | 3.5 | 3.5 | 5 | 5 |
|  | Air supply rate (ml/min) |  | 6.2 | 6.2 | *1 | 6.2 | 6.2 |
|  | Air gap (mm) |  | 150 | 170 | 50 | 30–350 | 30–350 |
|  | Water bath temp. (° C.) |  | 60 | 60 | 60 | 60 | 60 |
|  | Take-up speed (m/min) |  | 5 | 5 | 5 | 5 | 5 |
|  | Do before extraction (mm) |  | 1.949 | 1.949 | 1.905 | *2 | *2 |
|  | Di before extraction (mm) |  | 1.369 | 1.378 | 0.907 |  |  |
|  | Stretch ratio (times) |  | 1.7 | 1.7 | 1.6 |  |  |
| Physical properties | Outer diameter Do (mm) |  | 1.57 | 1.57 | 1.546 |  |  |
|  | Inner diameter Di (mm) |  | 1.065 | 1.072 | 0.727 |  |  |
|  | Thickness (mm) |  | 0.253 | 0.249 | 0.410 |  |  |
|  | Porosity (%) |  | 76.1 | 75.9 | 75 |  |  |
|  | Ave. pore size P (μm) |  | 0.13 | 0.131 | 0.089 |  |  |
|  | Max. pore size (μm) |  | 0.278 | 0.277 | 0.181 |  |  |
|  | Water permeability C value (/day, 100 kPa at 25° C.) |  | −8.5 | −8.7 | −37.1 |  |  |
|  | Fo value (m$^3$/m$^2$ · day, 100 kPa at 25° C.) |  | 71.1 | 72.2 | 66.3 |  |  |
|  | Fo/P |  | 546.9 | 551.1 | 744.9 |  |  |
|  | Fo/Di$^4$ |  | 55.3 | 54.7 | 237.3 |  |  |
|  | Tensile strength (MPa) |  | 11.4 | 10.9 | 9.7 |  |  |
|  | Elongation at break (%) |  | 21.2 | 18.2 | 13 |  |  |

*1: Natural aspiration.
*2: Hollow fiber could not be obtained.

INDUSTRIAL APPLICABILITY

As described above, according to the present invention, there is provided a porous hollow fiber of vinylidene fluoride resin which has a water permeation rate that is large per fiber and little dependent on the length, has a large treatment capacity per volume of a filtering module, and is therefore suitable as a microfilter element.

We claim:
1. A porous hollow fiber, comprising a stretched single layer of a vinylidene fluoride resin having a weight-average molecular weight of at least $3\times10^5$, having a water permeation rate F ($m^3/m^2\cdot day$) measured at a pressure difference of 100 kPa and at a water temperature of 25° C. in a range of test length L=0.2-0.8 (m) and expressed in a linear relationship with the test length L of: $F=C\cdot L+F_0$ (formula 1) and satisfying requirements (a)-(d) shown below:
 (a) an average slope C (/day) of: $-20\leq C\leq 0$,
 (b) an intercept (basic permeability) $F_0$ ($m^3/m^2\cdot day$) of: $F_0\leq 30$,
 (c) a relation between $F_0$ ($m^3/m^2\cdot day$) and an average pore diameter P (μm) according to half-dry method of $F_0/P\geq 500$,
 (d) an outer diameter of at most 3 mm,
 (e) a porosity of 65-80%, and
 (f) a relationship of: $F_0/D_i^4\leq 75$ between the basic permeability $F_0$ ($m^3/m^2\cdot day$) and an inner diameter $D_i$ (mm) of the hollow fiber;
  wherein the vinylidene fluoride resin comprises 2-49 wt. % of a first vinylidene fluoride resin having a weight-average molecular weight (Mw1) of $4\times10^5$-$12\times10^5$ and 51-98 wt. % of a second vinylidene fluoride resin having a weight-average molecular weight (Mw2) of $1.5\times10^5$-$6\times10^5$ provided that the weight-average molecular weight (Mw1) of the first vinylidene fluoride resin and the weight-average molecular weight (Mw2) of the second vinylidene fluoride resin satisfy a ratio Mw1/Mw2 of at least 1.2.

2. A porous hollow fiber according to claim 1, comprising a vinylidene fluoride resin having a weight-average molecular weight of at least $4\times10^5$.

3. A porous hollow fiber according to claim 1, comprising a vinylidene fluoride resin having a ratio Mw/Mn of at least 2.0 between a weight-average molecular weight (Mw) and a number-average molecular weight (Mn) thereof.

4. A porous hollow fiber according to claim 1, having an inner diameter of 0.8-2.98 mm and a wall thickness of 0.01-0.4 mm.

5. A process for producing a porous hollow fiber of vinylidene fluoride resin according to claim 1, comprising providing a composition by adding, to 100 wt. parts of a vinylidene fluoride resin having a weight-average molecular weight of at least $3\times10^5$, a plasticizer and a good solvent for vinylidene fluoride resin in a total amount of 100-300 wt. parts so that the good solvent occupies 8-22 wt. % therein; melt-extruding the composition into a form of hollow fiber; introducing the hollow fiber into an inert liquid while injecting an inert gas into a hollow part thereof to cool and solidify the hollow fiber; extracting the plasticizer to recover a porous hollow fiber; and stretching the hollow fiber before or after the extraction of the plasticizer,
 wherein the vinylidene fluoride resin comprises 2-49 wt. % of a first vinylidene fluoride resin having a weight-average molecular weight (Mw1) of $4\times10^5$-$12\times10^5$ and 51-98 wt. % of a second vinylidene fluoride resin having a weight-average molecular weight (Mw2) of $1.5\times10^5$-$6\times10^5$ provided that the weight-average molecular weight (Mw1) of the first vinylidene fluoride resin and the weight-average molecular weight (Mw2) of the second vinylidene fluoride resin satisfy a ratio Mw1/Mw2 of at least 1.2.

* * * * *